UNITED STATES PATENT OFFICE

HENRY DREYFUS, OF LONDON, ENGLAND

MANUFACTURE OF METHYL ALCOHOL

No Drawing. Application filed May 27, 1926, Serial No. 112,163, and in Great Britain June 13, 1925.

This invention relates to the manufacture of aliphatic compounds, and particularly of methyl alcohol, from mixtures of or containing carbon monoxide and hydrogen.

It has been known since 1913–1914 (British patent specification of Badische Anilin & Soda Fabrik No. 20488 of 1913) that, when mixtures of carbon monoxide and hydrogen in which the carbon monoxide is largely preponderant, are submitted to high temperature and high pressure, hydrocarbons together with a series of oxygenated aliphatic products are obtained. This process however is not of much commercial value, as a large number of products are produced together, each in relatively small amounts and the recovery and separation of these products is a matter of extreme difficulty and even impossibility. This is apparently the reason why the process was not followed up or developed. In recent years the problem was taken up and investigated by a Mr. Patart and details of his work were published. This was followed by research in other quarters, all tending to the same aim, namely to try to produce as main product methylic alcohol, the main principle being that whereas in the previous research and process of 1913–1914 an excess of carbon monoxide was used as compared with hydrogen, the new researches prescribed, quite apart from questions of temperature and pressure, the use, as main modification, of a substantial excess of hydrogen, the result being, it was stated, that methylic alcohol was essentially formed.

In connection with these further researches in other quarters many conflicting details and interpretations were given about the effect in employing the already previously proposed catalysts such as metallic compounds, from a point of view of their reducible and non-reducible qualities. Thus, for instance, it was stated in certain cases that non-reducible metals should be employed, whilst in other cases emanating from the same source it was indicated that these non-reducible metals were reducible metals. Further, it was stated in certain cases that no basic material must be used as being very bad, whilst in other cases the same people suggest on the same date that these basic materials are very good for the same purpose.

Now, whereas the main basis of the theory of the previous researches has been that the production of methyl alcohol as exclusive or practically exclusive product is due to the use of excess hydrogen, I have now found that for the production of methyl alcohol as exclusive or main product, it is not necessary to have an excess of hydrogen, and that, subject to the choice of catalyst and temperature employed, it is possible to obtain methyl alcohol as exclusive or principal product even with a reduced amount of hydrogen.

In order to perform this reaction in the sense indicated it is sufficient that the quantity of hydrogen relatively to the quantity of carbon monoxide present in the mixture should be in about the proportion ordinarily present in water gas, or, if the hydrogen and carbon monoxide are separately produced, that one uses them in such proportions as about one molecule of carbon monoxide to about one molecule of hydrogen, and further that one employs as catalysts substances which are capable of initiating combination of the hydrogen and carbon monoxide, probably to form formaldehyde, and owing to their having at the same time a basic character, are capable of forming methyl alcohol, probably by splitting off carbon monoxide from formaldehyde, or that one employs catalysts whereof one or some are capable of initiating the combination of the gases and another or others owing to their basic character are capable of effecting the transformation into methyl alcohol, the latter class of catalysts being employed either together in mixture with the former class, or in succession thereto, that is to say, the gases passing on in contact with them after passing in contact with the former class. In any case the catalysts employed are such as do not promote the formation of methane or more than traces of methane. In other words, the catalysts employed are such as are capable of effecting the combination of carbon monoxide and hydrogen to form oxygenated organic compounds.

It is understood that the proportion of hydrogen relatively to carbon monoxide may be somewhat lower or higher than that above mentioned, but about this.

It is likewise understood that the hydrogen and carbon monoxide may be separately produced or that one may employ water gas or other industrial gases or other gaseous mixtures which contain the gases in the prescribed proportions, or in which the proportions of the gases have been adjusted to the prescribed proportions.

The reaction is performed under heat and pressure.

The catalysts used may be known catalysts (other than catalysts which favour the formation of methane) which unite in themselves the dual capacity of combining the gases and of having at the same time a sufficiently basic character so as to form directly methyl alcohol; or mixtures of catalysts may be used of which one or some initiate the combination of the gases, and the other or others, being of sufficiently strongly basic nature, promote the transformation of the initial products into methyl alcohol. Or mixtures of catalysts having the said dual capacity with catalysts capable of effecting the transformation into methyl alcohol may be employed. Or the gases may be passed successively in contact with a catalyst or catalysts capable of initiating the combination of the gases (and capable or not of effecting the transformation into methyl alcohol) and a catalyst or catalysts of basic nature capable of effecting the transformation into methyl alcohol.

Some examples of catalysts which may be employed for the purpose of the invention are zinc oxide, copper oxide, copper chromate, zinc chromate, zinc aluminates, potassium zincate or mixtures of two together or several together; zinc oxide and potassium acetate or potassium carbonate, zinc oxide with aluminium, copper or zinc or tin with potassium carbonate or sodium carbonate or their corresponding acetates; or even caustic alkali combined with zinc oxide or copper oxide. In all cases potassium or sodium carbonate may be present or their corresponding acetates may be used in the presence of potassium or sodium carbonate or other basic catalysts or other basic substances. These catalysts are only enumerated in order to illustrate the nature of the catalysts to be employed, without being limitative, as any other known or suitable catalysts having a similar effect to what is above indicated can be used, be it in the form of metals or their salts or mixtures of metals and their salts, especially salts of the type of chromates, vanadates, etc., preferably when a catalyst of basic nature and especially relatively strong basic nature is present.

The temperature, especially when zinc or zinc oixde or their derivatives alone or in mixture with other catalysts are used, should not exceed about 350°–450° C. and is preferably kept between about 200° and 300° C.

The pressure employed varies according to the catalysts used and may be up to 200 atmospheres and more, but generally a pressure of about 50 to 150 atmospheres is used.

Based on the foregoing method of procedure, it is possible to produce in a continuous process and practically quantitatively methyl alcohol.

The reaction is preferably executed in a copper system, implying copper-lined apparatus, or in apparatus of other suitable metals, such as aluminium, etc., or other materials, according to the temperatures used.

In executing the process for the production of methyl alcohol the speed of passage of the gases has also an influence, as, if the gases are passed through at relatively low speed, hydrocarbons and higher alcohols may be formed.

What I claim and desire to secure by Letters Patent is:—

1. A process for the manufacture of methyl alcohol, comprising subjecting a gaseous mixture containing hydrogen and carbon monoxide in about equi-molecular proportion to the action of heat and pressure in the presence of a catalyst consisting solely of zinc oxide.

2. A process for the manufacture of methyl alcohol, comprising heating a gaseous mixture containing hydrogen and carbon monoxide in about equi-molecular proportion under pressure at a temperature less than about 450° C. in the presence of a catalyst consisting solely of zinc oxide.

3. A process for the manufacture of methyl alcohol, comprising heating a gaseous mixture containing hydrogen and carbon monoxide in about equi-molecular proportion under pressure at a temperature between about 200° and 300° C. in the presence of catalyst consisting solely of zinc oxide.

4. A process for the manufacture of methyl alcohol, comprising heating a gaseous mixture containing hydrogen and carbon monoxide in about equi-molecular proportion under a pressure not exceeding 200 atmospheres in the presence of a catalyst consisting solely of zinc oxide.

5. A process for the manufacture of methyl alcohol, comprising heating a gaseous mixture containing hydrogen and carbon monoxide in about equi-molecular proportion under a pressure between about 50 and 150 atmospheres in the presence of catalyst consisting solely of zinc oxide.

6. A process for the manufacture of methyl alcohol, comprising heating a gaseous mixture containing hydrogen and carbon monoxide in about equi-molecular proportion at a temperature less than about 450° C., and under a pressure not exceeding 200 atmospheres, in the presence of a catalyst consisting solely of zinc oxide.

7. A process for the manufacture of methyl alcohol, comprising heating a gaseous mixture containing hydrogen and carbon monoxide in about equi-molecular proportion at a temperature between about 200° to 300° C., and under a pressure between about 50 and 150 atmospheres in the presence of a catalyst consisting solely of zinc oxide.

In testimony whereof, I have hereunto subscribed my name.

HENRY DREYFUS.